(12) United States Patent
Kim

(10) Patent No.: US 11,171,896 B2
(45) Date of Patent: Nov. 9, 2021

(54) METHOD AND APPARATUS FOR INTEGRATING AND EXECUTING MULTIPLE MESSENGERS

(71) Applicants: Si On Kim, Incheon (KR); Insuk Kim, Seoul (KR)

(72) Inventor: Si On Kim, Incheon (KR)

(73) Assignees: Si On Kim, Incheon (KR); Insuk Kim, Seoul (KR)

( * ) Notice: Subject to any disclaimer, the term of this patent is extended or adjusted under 35 U.S.C. 154(b) by 648 days.

(21) Appl. No.: 16/086,486

(22) PCT Filed: Sep. 21, 2017

(86) PCT No.: PCT/KR2017/010420
§ 371 (c)(1),
(2) Date: Sep. 19, 2018

(87) PCT Pub. No.: WO2019/059432
PCT Pub. Date: Mar. 28, 2019

(65) Prior Publication Data
US 2021/0218694 A1    Jul. 15, 2021

(30) Foreign Application Priority Data
Sep. 20, 2017   (KR) .................. 10-2017-0121336

(51) Int. Cl.
*H04L 12/58*      (2006.01)
*H04L 29/06*      (2006.01)
(Continued)

(52) U.S. Cl.
CPC ............ *H04L 51/046* (2013.01); *G06F 9/468* (2013.01); *G06F 9/54* (2013.01); *G06F 9/546* (2013.01);
(Continued)

(58) Field of Classification Search
CPC ....... H04L 51/046; H04L 51/36; H04L 51/08; H04L 51/16; H04L 51/32; H04L 29/06; H04L 12/58; G06Q 50/01
See application file for complete search history.

(56) References Cited

U.S. PATENT DOCUMENTS 9,313,628 B2 *  4/2016  Hewes .................... H04W 4/18
10,156,966 B2 * 12/2018  Srinivasan .......... G06F 3/04817
(Continued)

FOREIGN PATENT DOCUMENTS

KR   10-2006-0107214 A   10/2006
KR   10-2011-0093630 A   8/2011
(Continued)

*Primary Examiner* — Sargon N Nano
(74) *Attorney, Agent, or Firm* — The PL Law Group, PLLC

(57) ABSTRACT

An apparatus for integrating and executing a plurality of messengers may include a communication unit configured to communicate with messenger servers and other electronic devices, a display unit configured to integrate and display a plurality of messengers on one screen, a storage unit configured to store an integrated messenger application which is a program for integrating and displaying the plurality of messengers and a plurality of messenger applications, and a controller configured to register at least two or more messenger applications selected by a user in the integrated messenger application and provide a messenger list to the plurality of registered messenger applications.

10 Claims, 9 Drawing Sheets

(51) Int. Cl.
*H04M 1/7243* (2021.01)
*G06F 9/46* (2006.01)
*G06F 9/54* (2006.01)
*G06Q 50/00* (2012.01)
*H04W 4/14* (2009.01)

(52) U.S. Cl.
CPC ............ *G06Q 50/01* (2013.01); *H04L 51/08* (2013.01); *H04L 51/16* (2013.01); *H04L 51/32* (2013.01); *H04L 51/36* (2013.01); *H04M 1/7243* (2021.01); *H04W 4/14* (2013.01); *H04L 65/403* (2013.01)

(56) References Cited

U.S. PATENT DOCUMENTS

| | | | | |
|---|---|---|---|---|
| 10,182,318 B2* | 1/2019 | Chatterjee | ......... | H04M 3/53333 |
| 10,372,520 B2* | 8/2019 | Johnston | ............. | G06F 11/0721 |
| 10,410,324 B2* | 9/2019 | Azeyanagi | ............. | G06T 11/60 |
| 10,739,943 B2* | 8/2020 | Chan | ..................... | G06F 3/0482 |
| 10,819,668 B2* | 10/2020 | Duan | ........................ | G06F 9/44 |
| 10,921,873 B2* | 2/2021 | Jha | ........................ | G06F 1/3262 |
| 11,016,637 B2* | 5/2021 | Ryu | ..................... | G06F 3/0488 |
| 11,042,904 B1* | 6/2021 | Gratz | ................. | G06Q 30/0267 |
| 2014/0201681 A1* | 7/2014 | Mahaffey | .......... | H04M 1/72454 |
| | | | | 715/846 |
| 2015/0227268 A1* | 8/2015 | Rathod | ..................... | G06F 8/61 |
| | | | | 715/739 |
| 2017/0142585 A1* | 5/2017 | Heredia | ............. | H04W 12/068 |

FOREIGN PATENT DOCUMENTS

| | | |
|---|---|---|
| KR | 10-1334116 B1 | 12/2013 |
| KR | 10-2014-0031595 A | 3/2014 |
| KR | 10-2014-0103363 A | 8/2014 |
| KR | 10-2014-0122801 A | 10/2014 |
| KR | 10-2015-0001873 A | 1/2015 |
| KR | 10-1660286 B1 | 9/2016 |
| KR | 10-2017-0085718 A | 7/2017 |

* cited by examiner

[800]

METHOD AND APPARATUS FOR INTEGRATING AND EXECUTING MULTIPLE MESSENGERS

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/010420, filed Sep. 21, 2017, which claims priority to the benefit of Korean Patent Application No. 10-2017-0121336 filed in the Korean Intellectual Property Office on Sep. 20, 2017, the entire contents of which are incorporated herein by reference.

TECHNICAL FIELD

The present invention relates to functions of integrally executing a plurality of messenger applications.

BACKGROUND ART

A messenger is instant messaging software that allows a user to send and receive messages and data in real time over the Internet. As with the development of communication technology, such a messenger function has become a major function in a portable electronic communication device such as a smart phone. However, types of the used messenger are different from each other depending on each country and culture area, or depending on individual tastes or usage. Thereby, there is inconvenience for a user to execute a plurality of messengers alternately depending on his/her chat partner or usage.

SUMMARY

In consideration of the above-mentioned circumstances, it is an object of the present invention to provide a method and an apparatus which may display a plurality of messenger applications on one screen in a list form, thus to reduce unnecessary access operations, and integrally manage data on the chats.

An apparatus for integrating and executing a plurality of messengers according to an aspect of the present invention may include: a communication unit configured to communicate with messenger servers and other electronic devices; a display unit configured to integrate and display a plurality of messengers on one screen; a storage unit configured to store an integrated messenger application which is a program for integrating and displaying the plurality of messengers and a plurality of messenger applications; and a controller configured to register at least two or more messenger applications selected by a user in the integrated messenger application and provide a messenger list to the plurality of registered messenger applications.

A method for integrating and executing multiple messengers in an electronic device according to another aspect of the present invention may include: executing an integrated messenger application; detecting a user request for adding a messenger in the integrated messenger application; displaying a download screen of additionally available messengers; when the selected messenger is previously installed, immediately registering the messenger in the integrated messenger application, and when the selected messenger is not installed, installing the messenger and then registering in the integrated messenger application; displaying at least two messengers whose registration is completed in a list; and selecting one of the at least two messengers displayed in the list to perform a function of the messenger.

According to the present invention, various types of messengers in a mobile device are integrated and displayed as one application, such that unnecessarily occurred operations may be minimized when chatting with a plurality of friends using different types of messengers, respectively.

DETAILED DESCRIPTION

Figure 1:
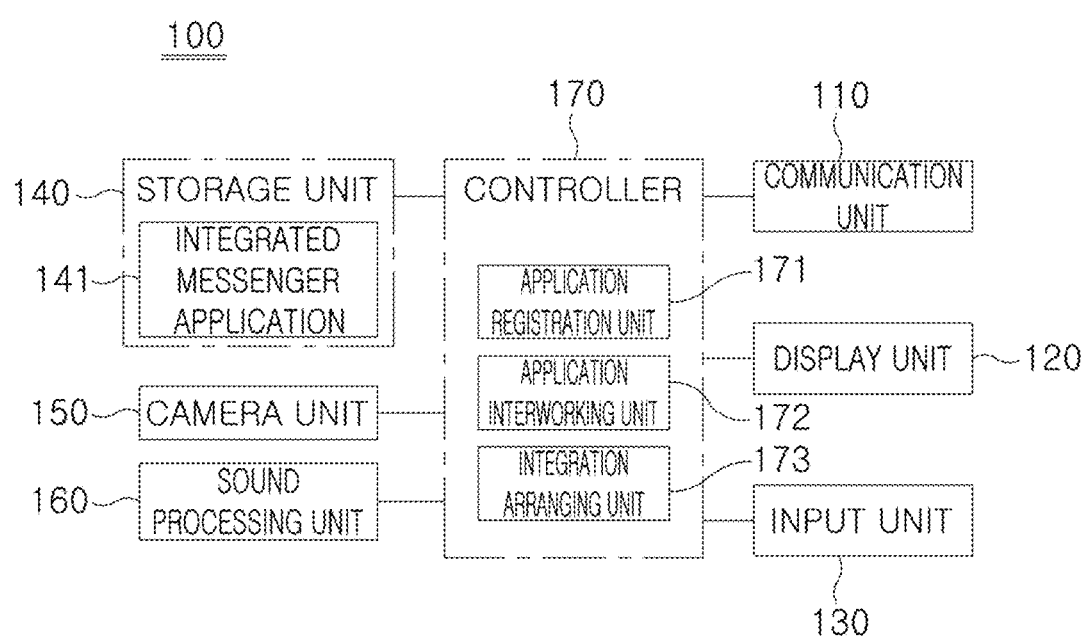
FIG. 1 is a block diagram illustrating a configuration of an electronic device for executing an integrated messenger application according to an embodiment of the present invention.

Hereinafter, preferred embodiments according to the present invention will be described in detail with reference to the accompanying drawings. The detailed description to be described below with reference to the accompanying drawings is intended to illustrate exemplary embodiments of the invention and is not intended to represent the only embodiment in which the invention may be executed.

It should be understood that embodiments of the present invention are provided so as to make sure that the disclosure of the present invention is comprehensive, and to clarify the scope of the invention for the benefit of persons having common knowledge in the technical field to which the present invention pertains ('those skilled in the art'). However, the present invention is defined only by the scope of the appended claims.

In some cases, well-known structures and devices will not be described or will be illustrated in a block diagram form centering on core functions of each structure and apparatus, to avoid obscuring concepts of the present invention. In the entire drawings, like reference numerals in the drawings denote like elements.

In the specification, when the explanatory phrase a part "comprises or includes" a component is used, this means that the part may further include the component without excluding other components, so long as special explanation is not given.

Further, the term " . . . unit" described in the specification means a unit for processing at least one function or operation, which may be implemented by hardware or software, or a combination thereof. In addition, as used herein the context for describing the present invention, the singular forms "a," "an," "one" and "the" are intended to include the plural forms as well, unless the context clearly indicates otherwise in the specification or is clearly limited by the context.

In addition, specific terms used in embodiments of the present invention are provided to facilitate understanding of the present invention. Unless otherwise defined, all terms including technical and scientific terms used herein have the same meaning as commonly understood by those skilled in the art. Use of such a specific term may be changed to other forms without departing from the technical spirit of the present invention.

An electronic device according to various embodiments in the present disclosure may include at least one of, for example, a smart phone, a tablet PC, a mobile phone, a video phone, an electronic book reader, a desktop, a laptop PC, a netbook computer, a workstation, a server, a PDA, a PMP, a mobile medical device, a camera or a wearable device. According to various embodiments, the wearable device may include at least one of accessory type devices (e.g., a watch, a ring, a bracelet, an ankle bracelet, a necklace, a pair of glasses, a contact lens or a head mounted display (HMD), textile or garment-integrated devices (e.g., electronic clothes), and body-mounted devices (e.g., a skin pad or tattoos).

Hereinafter, the electronic device according to various embodiments will be described with reference to the accompanying drawings. As used herein, the term user may refer to a person using the electronic device or a device (e.g., an artificial intelligence electronic device) using the electronic device.

FIG. 1 is a block diagram illustrating a configuration of an electronic device for executing an integrated messenger application according to an embodiment of the present invention.

An electronic device 100 may include a communication unit 110, a display unit 120, an input unit 130, a storage unit 140, a camera unit 150, a sound processing unit 160 and a controller 170.

The communication unit 110 may perform wired or wireless communication with other electronic devices and servers. The communication unit 110 may use, as a cellular communication protocol, at least one of, for example, LTE Advance (LTE-A), code division multiple access (CDMA), wideband CDMA (WCDMA), universal mobile telecommunications system (UMTS), wireless broadband (WiBro), global system for mobile communications (GSM) and the like besides LTE. Further, the communication unit 110 may include a local area communication module such as a wireless fidelity (WiFi) module, a near field communication (NFC) module, and a Bluetooth module. In addition, although not illustrated in the drawings, the communication unit 110 may further include a global navigation satellite system (GNSS) module. The GNSS module may include at least one of a global positioning system (GPS), a global navigation satellite system (Glonass), a Beidou navigation satellite system (hereinafter "Beidou") or Galileo, and the European global satellite-based navigation system depending on the using area, bandwidth and the like. Hereinafter, in the present disclosure, the wired communication may include at least one of a universal serial bus (USB), a high definition multimedia interface (HDMI), a recommended standard 232 (RS-232), a plain old telephone service (POTS) and the like. The network may include a telecommunications network, for example, at least one of a computer network (e.g., LAN or WAN), the Internet, or a telephone network.

The communication unit 110 according to the embodiment of the present invention may perform communication with other electronic devices using a messenger service or with servers for providing the messenger service. For example, the communication unit 110 may perform communication with the servers to download various types of messenger applications. Further, the communication unit 110 may perform communication with messenger servers for providing messenger services (e.g., message transmission/reception, file transmission/reception, and user authentication in a specific messenger application, etc.) performed in an integrated messenger application.

The display unit 120 may include, for example, a liquid crystal display (LCD), a light emitting diode (LED) display, an organic light-emitting diode (OLED) display, a microelectromechanical systems (MEMS) display, or an electronic paper display. The display unit 120 may display various contents (e.g., texts, images, videos, icons, symbols, etc.) to the user, for example. The display unit 120 may include a touch screen and may receive a touch, gesture, proximity, or hovering input by using an electronic pen or a part of a user's body, for example. Further, the display unit 120 may be implemented as a flexible, transparent, or wearable display.

The display unit 120 according to the embodiment of the present invention may display an execution screen of the integrated messenger application. For example, the display unit 120 may display an operation of selecting a messenger for transmitting a message, or an operation of inputting a message in the integrated messenger application. Further, the display unit 120 may perform operations of displaying the received messages for each type of the messenger. Furthermore, according to various embodiments, the display unit 120 may integrate the contents of the received messages and display according to a message reception time or sequence regardless of the types of the messengers.

In addition, the display unit 120 may display the type of the messenger to be registered in the integrated messenger application, and may display a name, a logo, or an icon of the messenger registered by a selection of the user in a list. Thereby, the user may check a plurality of messenger applications from the list displayed during executing the integrated messenger application, and may see at a glance the type of messenger operated in conjunction ('interworked') with the integrated messenger application. Furthermore, when executing the integrated messenger application, the display unit 120 may display a list of the plurality of registered messenger applications, and may display the number of unread messages for each messenger together with the list. Thereby, the user may grasp at a glance the status of the unread messages which are respectively received through various messengers.

Further, the display unit 120 may display operations of various functions that can be performed in the integrated messenger application such as a user authentication operation, a function of searching for a desired target in a friend list, or a function of searching for a specific word on a chat list performed in the plurality of messenger applications.

The input unit 130 may perform a role of transmitting commands or data input from the user or other external devices to other components of the device. The input unit 130 may include, for example, a touch panel, a (digital) pen sensor, and a key. The touch panel may use, for example, at least one of an electrostatic type, a pressure sensitive type, an infrared type, or an ultrasonic type panel. In addition, the touch panel may further include a control circuit. The touch panel may further include a tactile layer to provide a tactile response to the user. The (digital) pen sensor may be, for example, a part of the touch panel, or may include a separate sheet for recognition. The key may include, for example, a physical button, an optical key, or a keypad. When implementing in a touch screen form, the input unit 130 may also perform the function of the display unit 120 in one area.

The input unit 130 according to the embodiment of the present invention may receive an input of a user who requests an execution of the integrated messenger application. Further, when performing a chat function in the integrated messenger application, the input unit 130 may receive a text input which is input by the user. Furthermore, the input unit 130 may receive a user input for selecting various buttons and images displayed in the execution screen of the integrated messenger application. For example, the input unit 130 may receive a text input of the user for searching for a specific ID or a specific keyword among the chats in the integrated messenger application.

The input unit 130 may receive a user's operation of inputting a new message as part of a process for performing a chat with a specific friend. In addition, the input unit 130 may input information on a transmission target to search for a message transmission target after inputting a new message. The information on the transmission target may be information including at least one of a telephone number, an identification (ID), a name, and an e-mail address, for example.

The storage unit 140 may include an internal memory and/or an external memory. The internal memory may include, for example, at least one of a volatile memory, a non-volatile memory, a flash memory, and a hard drive. The external memory may include a flash drive, and may further include, for example, a compact flash (CF), a secure digital (SD), a micro secure digital (Micro-SD), a mini secure digital (Mini-SD), a memory stick or the like. The external memory may be functionally and/or physically connected with the electronic device through various interfaces.

The storage unit 140 according to the embodiment of the present invention may store files and operating systems associated with an integrated messenger application 141. Further, the storage unit 140 may store an individual messenger application to be registered and managed in the integrated messenger application 141. Furthermore, the storage unit 140 may store various types of files such as a text, video, or voice file for each type, which are received through the integrated messenger application according to the embodiment of the present invention. According to various embodiments, the storage unit 140 may classify and store attachment files for each messenger, which are received through the respective messengers.

Further, the storage unit 140 may store user authentication information required for a user to access the integrated messenger application. For example, the user authentication information may include the ID, the password, or the telephone number, etc. of the user for each messenger. In addition, a user authentication verification means conventionally performed in the art may be used for user authentication. For example, the user authentication may be performed by a method of inputting contents of an authentication code received by a user mobile phone registered in accounts of each messenger, or a method of inputting contents of an authentication code received by a user email address registered in the account of the messenger.

The camera unit 150 is a device capable of photographing still and moving images, and according to an embodiment, may include one or more image sensors (e.g., a front sensor or a rear sensor), a lens, an image signal processor (ISP), or a flash (e.g., an LED or xenon lamp, etc.).

The camera unit 150 according to the embodiment of the present invention may photograph a user of the electronic device when performing a chat function based on a video format in the messenger application. Further, the camera unit 150 may include a camera dedicated for recognition, which performs operations such as iris recognition and facial recognition to execute person verification in the messenger application.

The sound processing unit 160 may include a microphone and a speaker, and may perform a function for converting a digital voice signal to an analog sound, or converting the analog sound to a digital voice signal.

The sound processing unit 160 according to the embodiment of the present invention may receive a voice input of the user to execute the integrated messenger application. Further, the sound processing unit 160 may input a user voice through the microphone to transmit a chat message using the voice during chatting by means of the integrated messenger application, or may output a voice message transmitted from a chat partner through the speaker.

The controller 170 may control an overall operation performed in the electronic device 100. The controller 170 may also be referred to a processor, a control unit, a microcontroller, a microprocessor, a microcomputer or the like. Meanwhile, the controller 170 may be implemented by hardware, firmware, or software, or a combination thereof. When implementing by firmware or software, the controller according to the embodiment of the present invention may be implemented in a form of a module, a procedure, a function, or the like that performs the functions or operations described above. Software codes may be stored in the storage unit 140 and may be driven by the controller 170. The storage unit 140 may be located inside or outside the electronic device 100, and may send and receive data to and from the controller 170 by various means already known in the art.

The controller 170 according to the embodiment of the present invention may include an application registration unit 171, an application interworking unit 172, and an integration arranging unit 173. The controller 170 may control operations associated with the execution of the integrated messenger application according to the embodiment of the present invention. For example, if it is determined that an icon corresponding to the integrated messenger application is selected by the user, the controller 170 may control the integrated messenger application so as to be executed. Further, when the integrated messenger application is executed, the controller 170 may determine the type of the messenger previously interworked with the integrated messenger application ('pre-interworked messenger'), and display the pre-interworked messenger in a list form according to a registered sequence. In addition, the controller 170 may further register an application in the integrated messenger application, and functions of the registered application may be performed in the application registration unit 171. Further, the application registration unit 171 may support so as to register not only the type of application and connection information but also user account information such as a password and an ID of the user for accessing the registered messenger application.

The application interworking unit 172 of the controller 170 may control the integrated messenger application so that functions of the messenger registered therein are performed on the integrated messenger application. When receiving a message via a specific messenger (e.g., Ka(X)oTalk) registered in the integrated messenger application, the application interworking unit 172 may operate the messenger application of the specific messenger in conjunction with the integrated messenger application so as to allow the user to check the received message on the execution screen of the integrated messenger application. In addition, when performing search functions such as a friend search function or a previous chat search function, the application interworking unit 172 may search for information requested by the user in the data of the messenger selected by the user among the pre-registered messenger applications.

Further, the controller 170 may include the integration arranging unit 173, and the integration arranging unit 173 may support so as to display chat windows of a plurality of messenger applications with different types on one screen. Further, according to various embodiments, the integration arranging unit 173 may integrate and display the files received and stored through the integrated messenger application in an order stored in the electronic device 100 regardless of the types of the individual messengers. Furthermore, the integration arranging unit 173 may change and arrange the display order of the various lists displayed on the integrated messenger application according to a preset standard or a standard set by the user. For example, when displaying the list of the messenger applications, the integration arranging unit 173 may display the list from a messenger application having the largest number of unread messages in descending order. Alternately, the integration arranging unit 173 may preferentially display a messenger having the most recently received message.

Hereinafter, operations of registering a new messenger application in the integrated messenger application will be described with reference to FIGS. 2 and 3.

Figure 2:
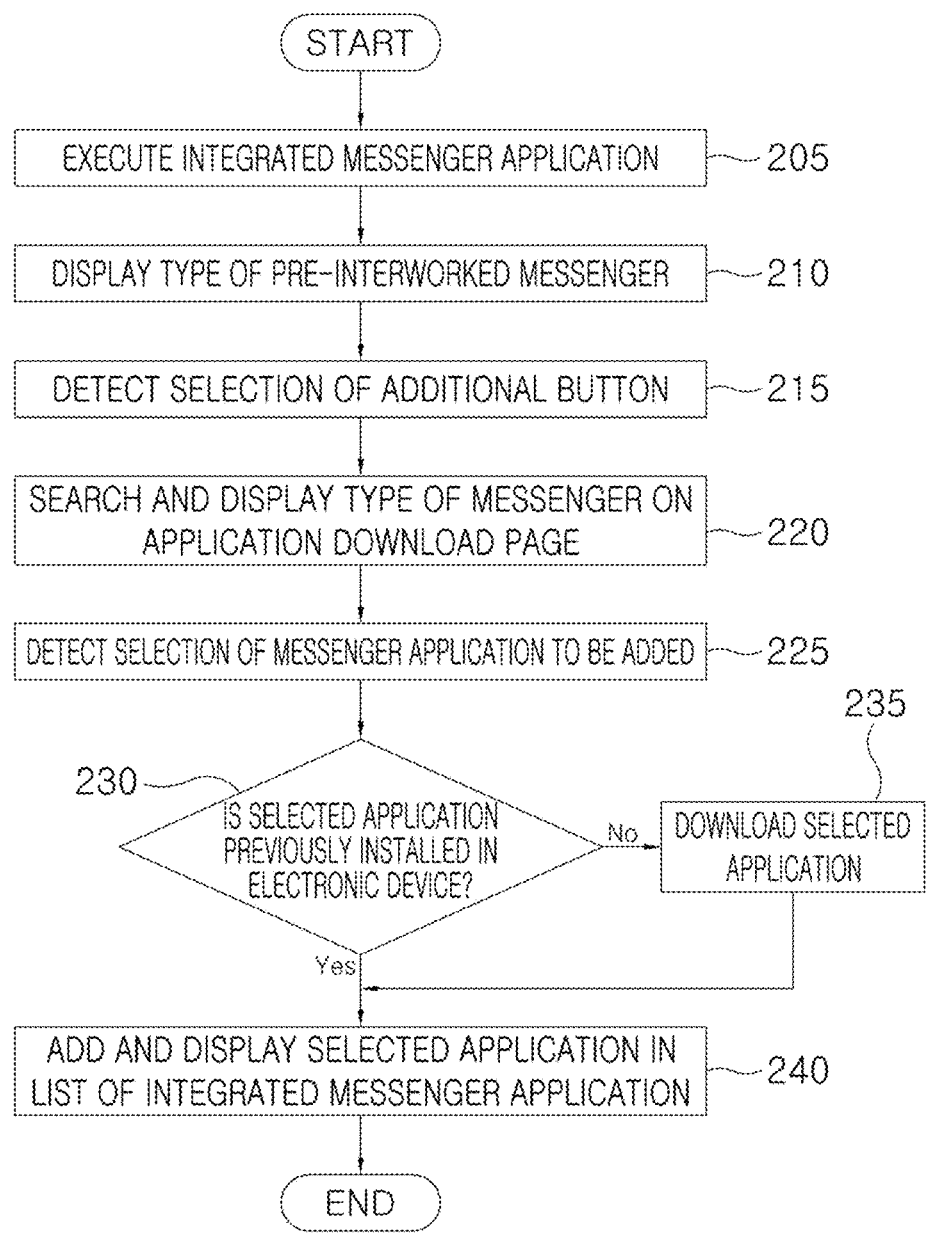
FIG. 2 is a flowchart illustrating a procedure in operations of registering a new messenger application in the integrated messenger application according to the embodiment of the present invention.

FIG. 2 is a flowchart illustrating a procedure in operations of registering a new messenger application in the integrated messenger application according to the embodiment of the present invention.

Figure 3:
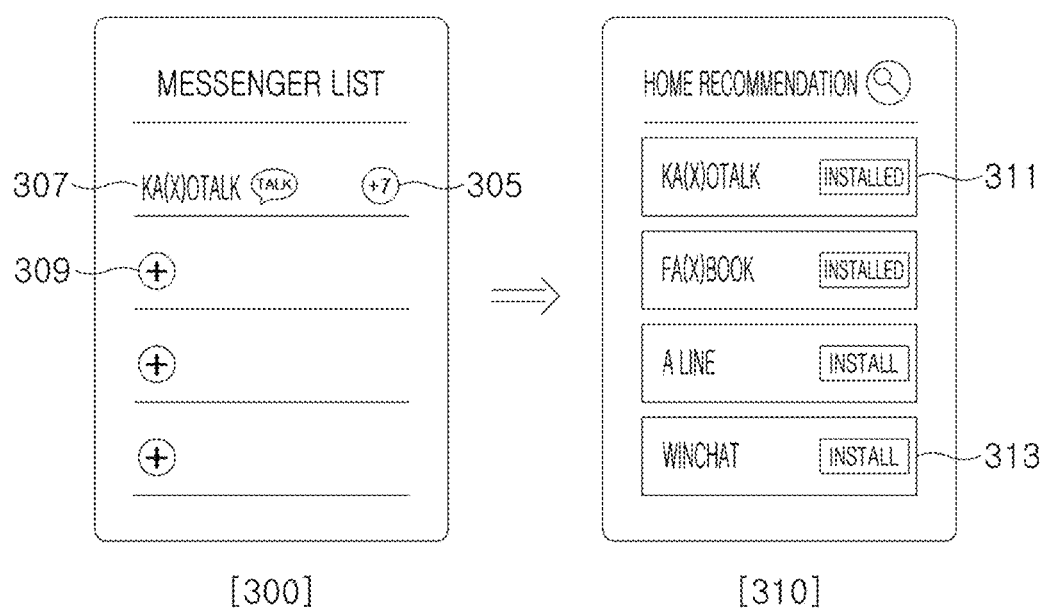
FIG. 3 is a diagram illustrating an example of a screen for registering a new messenger application in the integrated messenger application according to the embodiment of the present invention.

FIG. 3 is a diagram illustrating an example of a screen for registering a new messenger application in the integrated messenger application according to the embodiment of the present invention.

The controller 170 may perform an operation (205) of executing the integrated messenger application according to a user request. The user request for executing the integrated messenger application may include at least one of a touch input (e.g., a single touch or a gesture) and a voice input.

Then, the controller 170 may perform an operation (210) for displaying the type of the pre-interworked messenger. At this time, the storage unit 140 may store information on the messenger which is registered in and interworked with the integrated messenger application. In addition, when a specific messenger is newly added to operate in conjunction with the integrated messenger application, program information on the added messenger may be newly stored in the storage unit 140. Thereby, the controller 170 may read the information on the messenger, which is set so as to operate in conjunction with the integrated messenger application, from the storage unit 140, and display the messenger application corresponding to the messenger in a list form. At this time, the controller 170 may control the integrated messenger application so as to simply display the type of the interworked messenger only with a messenger logo.

When displaying a list of the pre-interworked messengers in the operation (210), the controller 170 may display the list as shown in a screen 300 of FIG. 3. Referring to the screen 300, a first area 307 in the list of the pre-interworked messengers displays a name of a messenger called 'Ka(X)oTalk.' Displaying the messenger name only in the first area 307 may mean that there is only one messenger which is interworked with the integrated messenger application. In addition, the logos and abbreviations, etc. of the messengers may be displayed in the list of pre-registered messengers instead of the names of the messengers. Alternately, the names, the logos, and the abbreviations, etc. of the messengers may be simultaneously displayed in the list. Further, information 305 on the received message in an unread state may be displayed in the list on one side of the screen.

Thereafter, the controller 170 may perform an operation (215) of detecting a user request for adding a messenger application to be operated in conjunction with the integrated messenger application ('interworking messenger application'). This may be an operation in which the controller 170 detects a selection of additional buttons. In the screen 300 of FIG. 3, components corresponding to the additional buttons are shown by numeral 309. The additional buttons may be located at various places (e.g., on one upper side of the screen, or one lower side of the screen) in addition to the positions shown on the screen 300.

When a user request (e.g., selection of the additional button) for adding the interworking messenger application is detected, the controller 170 may perform an operation (220) of displaying search results for the type of the messenger on an application download page. According to various embodiments, the controller 170 may control so as to display only messengers previously stored in the electronic device 100 of the user, or exclude the applications previously registered in the integrated messenger application. Further, according to various embodiments, the controller 170 may display a screen for displaying the type of the application installed in the electronic device 100, not the application download page. In this case, the user may download the messenger to be added in the electronic device 100 in advance, and then add a messenger of the interworking messenger application thereto. In addition, the controller 170 may display an additionally available messenger application in various ways.

The operation (220) may be performed as an operation of displaying the application download page (e.g., a Google Store) as shown in a screen 310 of FIG. 3. As illustrated in the screen 310, the controller 170 may display the additionally available messenger applications in a list form. In addition, the controller 170 may display the additionally available messenger applications from a messenger having the largest number of downloads in descending order. In addition, according to various embodiments, the controller 170 may display a messenger application present in the user electronic device 100 at an upper end of the screen. The messenger 'Ka(X)oTalk' present in an area 311 of the screen 310 is displayed together with a phrase 'installed.' On the other hand, a messenger 'WinChat' present in an area 313 is displayed together with a phrase 'install.' Thus, it may be inferred that the 'WinChat' is not installed in the electronic device 100.

After the operation (220), the controller 170 may perform an operation (225) of detecting a selection of the messenger application to be added.

When a specific messenger application is selected by the user from the list in which the additionally available messenger applications are displayed, the controller 170 may perform an operation (230) to determine whether the selected messenger application has been previously installed in the electronic device 100. If the selected messenger application is not installed in the electronic device 100, in this state, the controller 170 may perform an operation (235) of downloading the selected application. For example, when the selection of the area 313 in the screen 310 of FIG. 3 is detected or the selection of the 'install' button in the area 313 is detected, the controller 170 may perform a series of operations for downloading the 'WinChat' application.

On the other hand, if it is determined that the application selected in the operation (230) step is an application previously installed in the electronic device 100, the controller 170 may add and display the selected application in an integrated messenger application list. Further, the controller 170 may also perform an operation (240) of adding and displaying the application after the download of the application is completed in the operation (235).

Next, operations of transmitting a message in the integrated messenger application will be described with reference to FIGS. 4 and 5.

Figure 4:
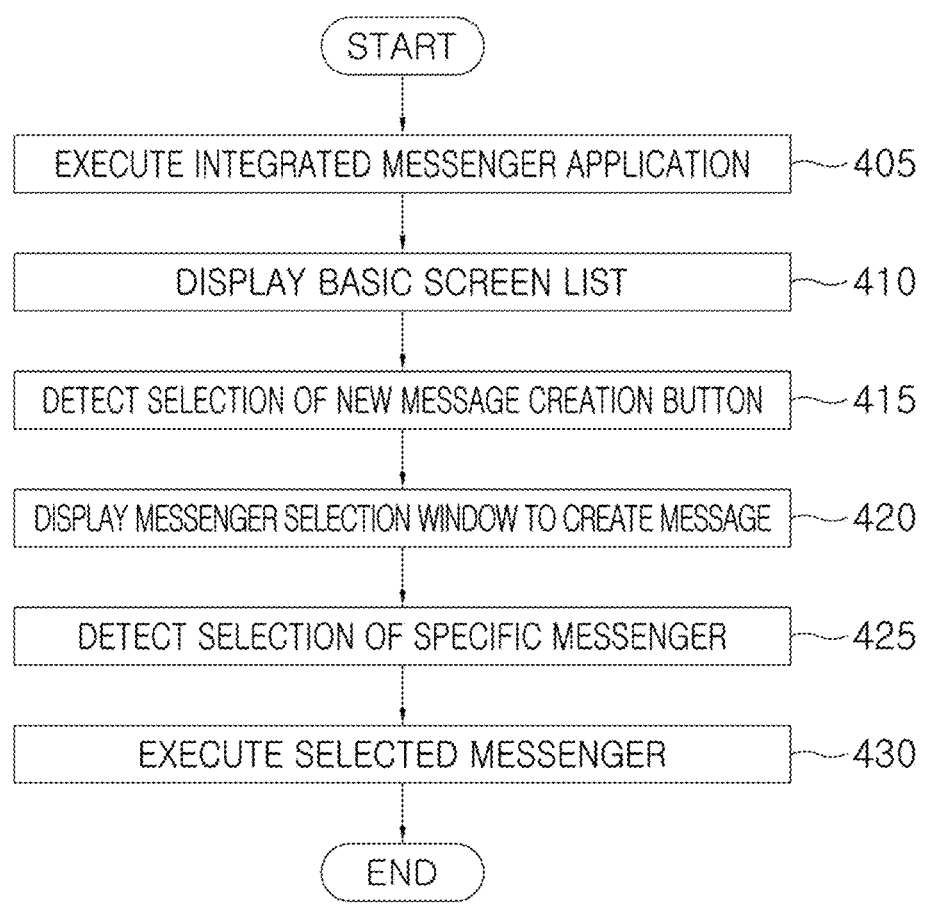
FIG. 4 is a flowchart illustrating a sequence in operations of transmitting a message in the integrated messenger application according to the embodiment of the present invention.

FIG. 4 is a flowchart illustrating a sequence in operations of transmitting a message in the integrated messenger application according to the embodiment of the present invention.

Figure 5:
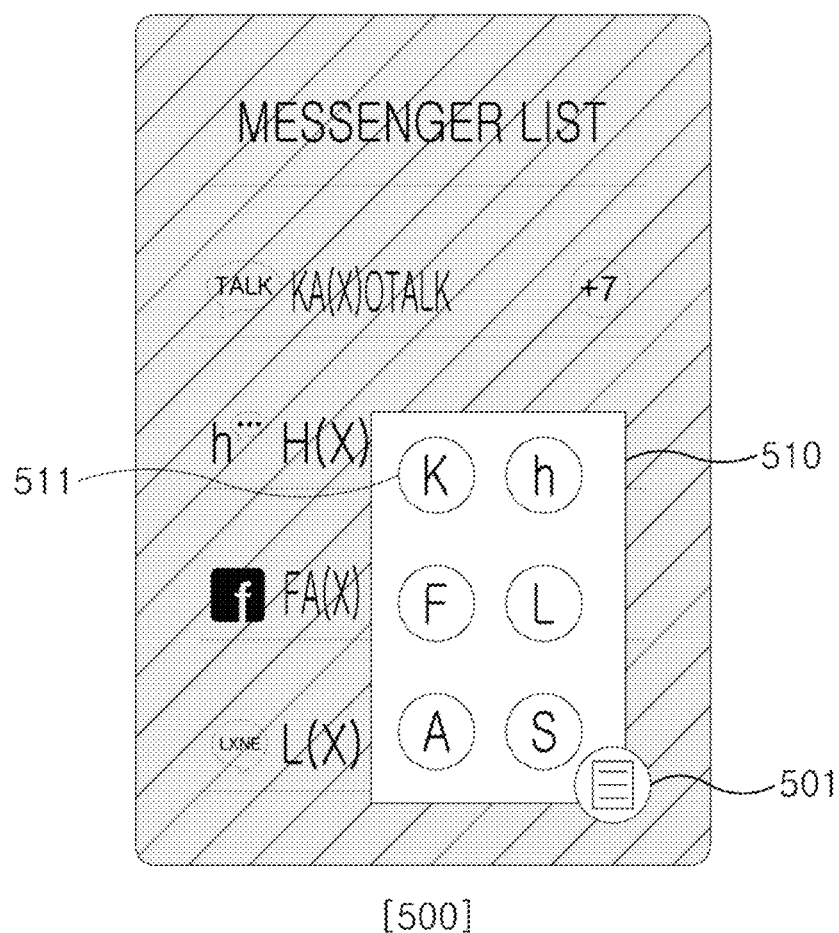
FIG. 5 is a view illustrating an example of a screen in operations of transmitting a message in the integrated messenger application according to the embodiment of the present invention.

FIG. 5 is a view illustrating an example of a screen in operations of transmitting a message in the integrated messenger application according to the embodiment of the present invention.

The controller 170 may perform an operation (405) of executing the integrated messenger application by various ways of requests including a touch and voice of the user. Then, the controller 170 may perform an operation (410) of displaying a basic screen list. According to various embodiments, it is possible to select the basic screen by the user. For example, a screen for displaying the type of the registered application may be the basic screen of the integrated messenger application, or a screen for displaying a friend list in which both the messenger names and friend IDs are displayed may be the basic screen. In addition, various ways of basic screens may be displayed. Further, a new message creation button may be displayed on one side of the screen regardless of the types of the basic screens. Referring to FIG. 5, the new message creation button may be a button 501 displayed on one lower side of a screen 500. According to various embodiments, the new message creation button 501 may be displayed at all times on the screen 500, or may be conditionally displayed on the screen in response to a specific touch, gesture, or hovering input.

When an operation (415) of detecting that the new message creation button 501 is selected by the user is performed, then the controller 170 may perform an operation (420) of displaying a messenger selection window 510 for selecting a messenger to create a message. The messenger selection window 510 may display the applications registered in the integrated messenger application. When displaying the messengers, the messenger selection window 510 may display the messengers with an image which is the simplest form. For example, the controller 170 may display only the logo of each application in the messenger selection window 510, thereby effectively identifying the applications. Alternately, the messenger selection window 510 may include buttons corresponding to each messenger in such a manner that only the first letter of each messenger's name is displayed as illustrated by numeral 511. However, it is not limited thereto, and according to various embodiments, each of the selection buttons included in the messenger selection window 510 may specify the full name of the messenger.

Thereafter, the controller 170 may perform an operation (425) of detecting a selection of a specific messenger by the user. In addition, the controller 170 may perform an operation (430) of executing the selected messenger. The subsequent processes are the same as those of transmitting messages to the other electronic devices through the messenger, therefore will not be described.

According to various embodiments, the messenger selection for message transmission may be performed through a single touch gesture from the operation (415) of selecting the new message creation button to the operation (425) of detecting the selection of the specific messenger. In other words, when the user selects the new message creation button through a screen touch, the user may select the messenger in a method of moving a touch point by a drag while maintaining the touch, and then releasing the touch at a specific point. In this case, the messenger displayed at the point where the touch is released may be selected.

However, it is not limited thereto, and the method for transmitting a message through the integrated messenger application may be various. According to the embodiment of the present invention, a plurality of messenger applications may be arranged and operated in conjunction with the integrated messenger application. Therefore, the user may first create a message in the integrated messenger application, then select a type of the messenger, and select a transmission target from the friend list in the selected messenger. Alternately, the user may transmit the message in a method of first creating a message in the integrated messenger application, and then selecting information such as an ID or phone number of the transmission target. In this case, when the information such as the ID or telephone number of the transmission target is input, the controller 170 may automatically detect a messenger having a target matched with the information in the friend list, and transmit the message to the transmission target using the detected messenger. According to various embodiments, if it is determined that all the targets corresponding to the input ID or telephone number are registered as friends in the plurality of messengers, the controller 170 may transmit a message to the most recently used messenger, or the most frequently used messenger for a chat.

Figure 6:
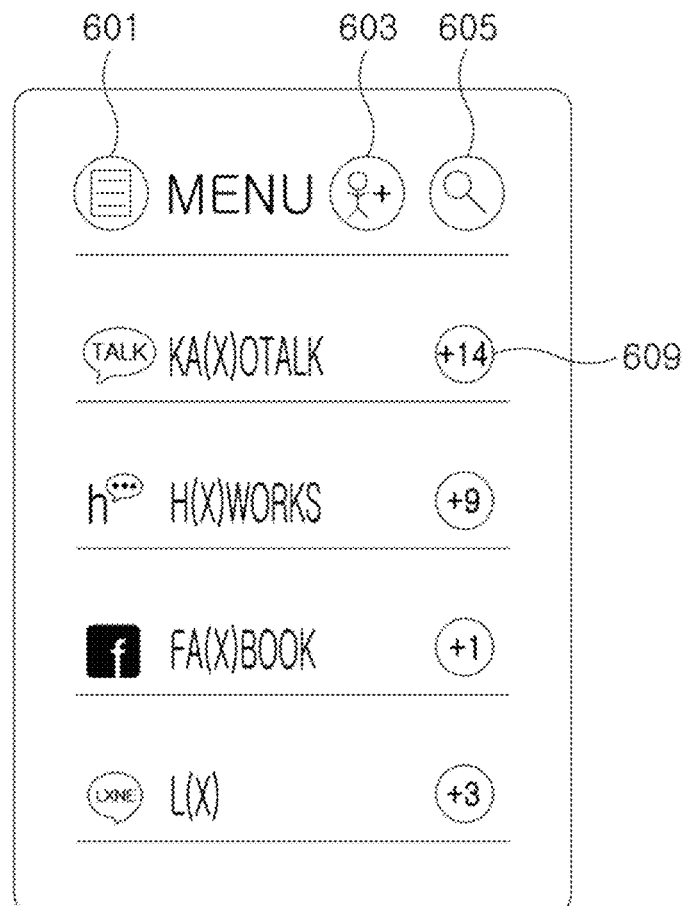
FIG. 6 is a diagram illustrating an example of a screen for checking received messages in the integrated messenger application according to the embodiment of the present invention.

FIG. 6 is a diagram illustrating an example of a screen for checking the received messages in the integrated messenger application according to the embodiment of the present invention.

As illustrated in a screen 600, a menu button 601, an add friend button 603, and a search button 605 may be displayed at the top of the basic screen of the integrated messenger application. In addition, the type of the messenger registered by the user may be displayed in a list form on the basic screen. An order in which the registered messengers are displayed on the list may be changed by a user's setting. According to various embodiments, the order in which the messengers are displayed on the screen 600 may be determined in an order of applications that the user frequently uses, or otherwise, may be determined based on a message arrival sequence. Alternately, the order in which the messengers are displayed may be determined according to an order of a messenger having the largest number of unread messages in descending order Referring to the screen 600, for example, the number information of the unread messages received via Ka(X)oTalk messenger may be represented by numeral 609. According to various embodiments, when selecting the number information 609 of the unread messages, the controller may display the messages or the chat list so that the user can check the unread messages. This is an operation that is conventionally performed in the messenger application, and therefore will not be illustrated in detail in the drawings.

Figure 7:
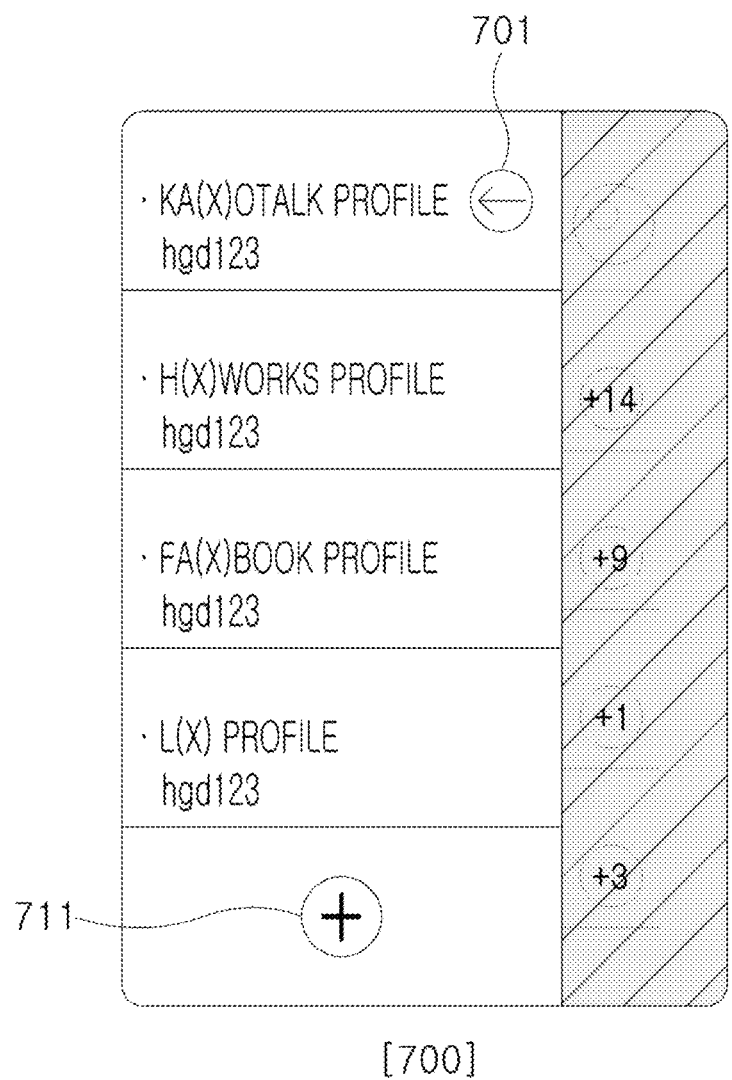
FIG. 7 is a diagram illustrating an example of a screen for managing profiles in the integrated messenger application according to the embodiment of the present invention.

FIG. 7 is a diagram illustrating an example of a screen for managing profiles in the integrated messenger application according to the embodiment of the present invention.

FIG. 7 illustrates a screen 700 in which a plurality of account information registered in one user account of the integrated messenger application are displayed on one screen. In addition, the screen 700 may be displayed by selecting the menu button 601 on the screen 600. The controller 170 may display profile information corresponding to the account of the integrated messenger application at the top of the screen (e.g., the screen 700) on which the user account information is displayed, and may sequentially display each account information of the other registered messengers besides the profile information. At this time, information displayed on the screen 700 may be 'messenger names and IDs' used in the messengers, etc. In addition, profile picture information, phrase information displayed on the profile, presence or absence of registration of other information (e.g., telephone number, birthday, etc.), and the like may be displayed on the screen 700. An area in which the integrated account information is displayed on the screen 700 may be hidden by selecting a button 701.

Further, according to various embodiments, the respective messenger applications are only connected to the integrated messenger application so as to perform their own functions, but it may be necessary to separately register the account information of the respective messenger applications in the integrated messenger application. In this case, the user may register the account information of the pre-registered messenger applications by selecting an add account button 711 displayed on one side of the screen 700.

Although not illustrated in the drawings, according to various embodiments, when registering the account information of the respective messenger applications in the integrated messenger application, a process for authenticating whether a user is the user of the registered account may be further performed. In addition, since the respective messenger accounts have already been authenticated in the integrated messenger application, it may be set so that the controller 170 releases a password lockout of the respective messengers when executing the integrated messenger application. For example, when a password is set in the integrated messenger application and the user authentication is completed by inputting IDs, the passwords, and the like for each messenger account, the controller 170 may request for releasing the password lockout of the authorized messenger to the user only during executing the integrated messenger application. In other words, this means that, in each case in which assessing of the messenger application is performed through a pathway using the integrated messenger application and is performed through a pathway without using the same, the controller 170 may separately support the password lockout setting.

As described above, in order to allow the user to freely access the plurality of messengers only by accessing the integrated messenger application, the controller 170 may encrypt and store login information and the passwords corresponding to each messenger in an integrated messenger application server, or in the storage unit 140 of the electronic device 100. When the user accesses the integrated messenger application through the password, the controller 170 may support so that the user may freely browse the messages of each messenger using the pre-stored login information and the passwords. Accordingly, after the user accesses the integrated messenger application by inputting the password, the user may freely use various types of messengers without inputting a separate additional password.

Figure 8:
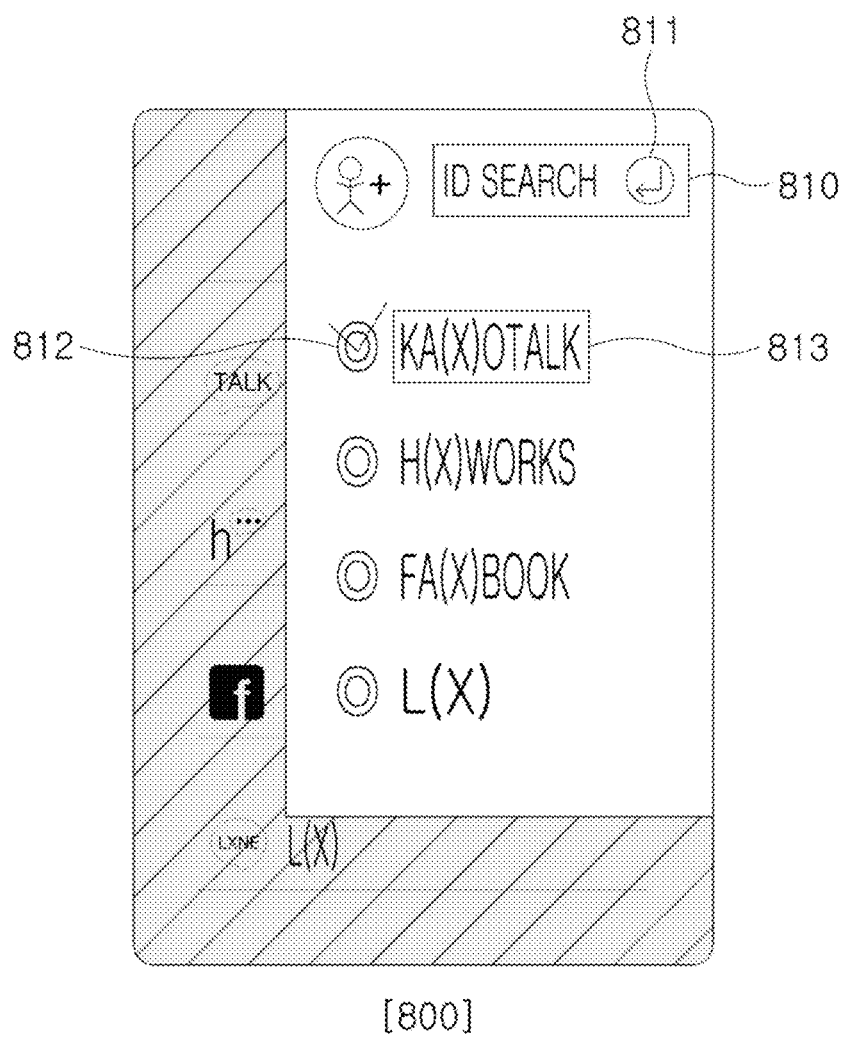
FIG. 8 is a diagram illustrating an example of a screen in operations of adding a friend in the integrated messenger application according to the embodiment of the present invention.

FIG. 8 is a diagram illustrating an example of a screen in operations of adding a friend in the integrated messenger application according to the embodiment of the present invention.

A screen 800 of FIG. 8 may be displayed by selecting the add friend button 603 on the screen 600. According to various embodiments, when wishing to search for a specific target to be sent a message, a search screen may be displayed similar to the method shown on the screen 800. According to the embodiment of the present invention, in order to perform a function of adding friends, the controller 170 may display an input window 810 for receiving at least one of other account information (e.g., phone number, e-mail address, or name, etc.) including an ID from the user. In addition, the controller 170 may display a search button 811 for requesting a search on one side of the inside or outside of the input window 810. In addition, the controller 170 may select a messenger to be searched, and may sequentially display all the applications registered in the integrated messenger application. Further, the controller 170 may display a check box 812 for indicating whether to select as a search target together with the messenger name 813.

For example, when a user wishes to add a friend only to 'Ka(X)oTalk,' the user may input a specific ID in the input window 810, and then select the check box 812 for selecting only 'Ka(X)oTalk' as the search target.

According to various embodiments, even if there is no purpose to adding a friend, a user may perform a search operation to search for a user previously registered in the friend list. In this case, the user may input any one of the ID, the name, the telephone number, and the e-mail address thereof in the input window in the similar method thereto to select a plurality of messengers to be searched. This allows the user to find out the type of messenger that is being used by his or her friend by using the search function when the user is not sure in which messenger his or her friend is registered.

Figure 9:
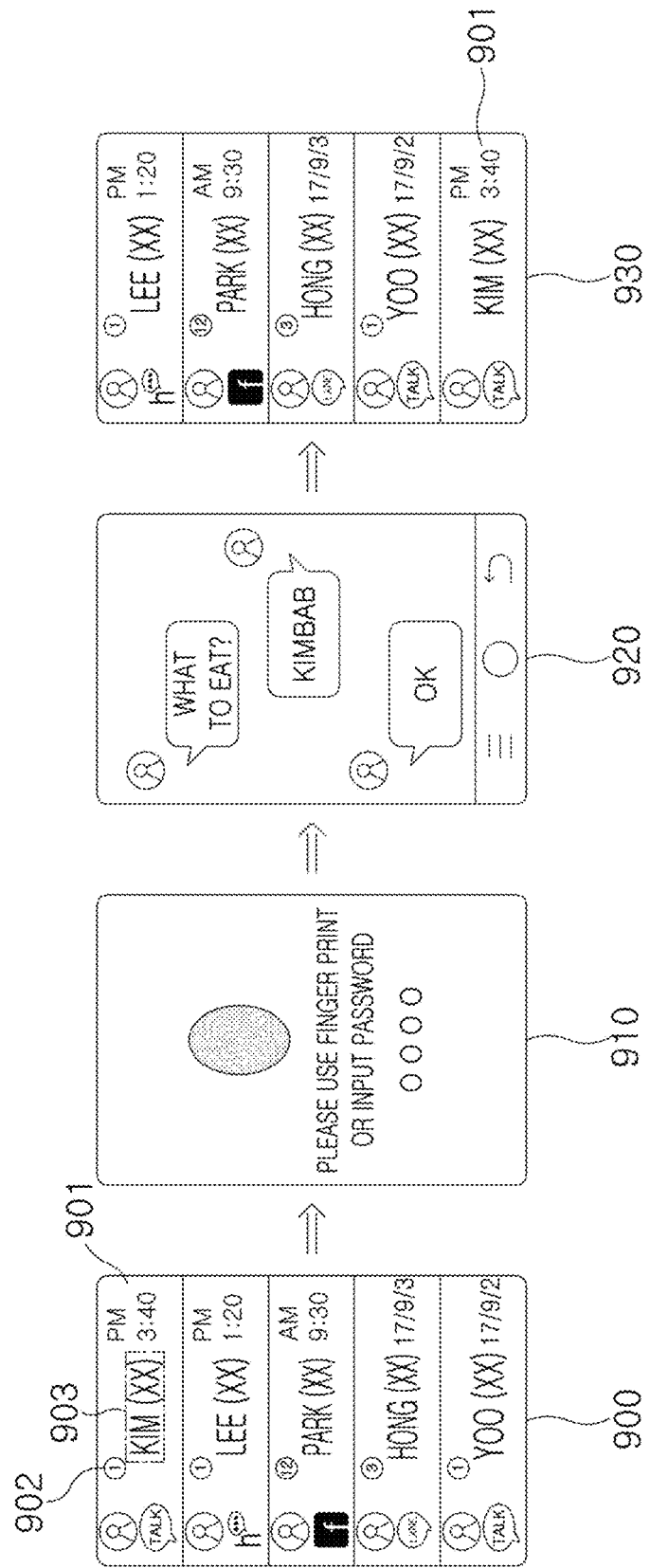
FIG. 9 is a diagram illustrating an example of screens in operations of displaying chat lists in the integrated messenger application according to the embodiment of the present invention.

FIG. 9 is a diagram illustrating an example of screens in operations of displaying chat lists in the integrated messenger application according to the embodiment of the present invention.

The integration arranging unit 173 of the controller 170 may support so as to display the chat window performed by various types of messengers on one screen. As illustrated in a screen 900, the integration arranging unit 173 may display a chat list in a plurality of chat window areas 901. The chat window area 901 illustrated in the screen 900 may serve as a button so as to display the chat window fully on the screen according to selection of the user. In addition, messenger type information that supports the chat window may be displayed on one side of the chat window area 901. Further, identification information 903, which is set in any one method of an ID, a name, and a nickname of a partner who participates in chats, may be displayed in the chat window area 901. Furthermore, information 902 on the number of the unread messages may also be displayed in the chat window area 901. In addition, account information such as a recent message reception time, a profile picture of a chat partner, and the like may be displayed together in the chat window area 901.

When selecting the chat window area 901 displayed at the top of the screen 900, according to various embodiments of the present invention, the controller 170 may display a screen 910 for executing user authentication to access the messenger that supports the chat window. The authentication execution screen displayed on the screen 910 may be changed depending on the type of the messenger. In addition, the authentication execution screen 910 may also be omitted according to various embodiments.

Thereafter, the controller 170 may display a screen 920 corresponding to the chat window. In addition, when the screen 920 corresponding to the chat window is displayed to check the unread messages, and then the chat list is again displayed, the controller 170 may set so that the chat window area 901 is displayed at a lower end from the chat window areas in which the unread messages are present.

Although preferred embodiments of the present invention that have been described using specific examples, the specification and drawings are to be regarded in an illustrative rather than a restrictive sense in order to help understand the present invention. Accordingly, it should be understood by those skilled in the art that various modifications and changes made based on the technical idea of various embodiments of the present invention in addition the preferred embodiments of the present invention disclosed herein are included in the scope of the various embodiments of the present invention.

The invention claimed is:

1. An apparatus for integrating and executing a plurality of messengers in an electronic device, the apparatus comprising:
    a communication unit configured to communicate with messenger servers and other electronic devices;
    a display unit configured to integrate and display a plurality of messengers on one screen;
    a storage unit configured to store an integrated messenger application which is a program for integrating and displaying the plurality of messengers and a plurality of messenger applications; and
    a controller configured to register at least two or more messenger applications selected by a user in the integrated messenger application and provide a messenger list to the plurality of registered messenger applications,
    wherein the storage unit stores user accounts and user authentication information of each registered messenger, and when lockout of the integrated messenger application is set, and if executing the integrated messenger application, the controller releases the lockout setting of each messenger; and
    the controller is configured to:
        display account information of the integrated messenger application and each account information of the registered messengers of the user on one screen in a list form in response to a menu button selection from the user;
        provide an add account button for adding the account information to the screen displayed in the list form;
        when selecting the add account button, provide a user authentication information inputting environment for inputting user authentication information for each messenger; and when inputting the user authentication information, perform a user authentication based on the input user authentication information to set the integrated messenger application in a state of executing each messenger without an additional authentication process therein.

2. The apparatus according to claim 1, wherein the controller comprises:
    an application registration unit configured to register at least two or more messenger applications in the integrated messenger application in response to a user request;
    an application interworking unit configured to execute the at least two or more registered messenger applications in conjunction with the integrated messenger application in an execution screen of the integrated messenger application; and
    an integration arranging unit configured to display a chat list generated through the at least two or more registered messenger applications according to a message reception sequence regardless of types of the messengers.

3. The apparatus according to claim 1, wherein the storage unit stores files received through the plurality of registered messengers together with messenger information, and
    the controller provides an option to display the received files in one list regardless of types of the messengers.

4. The apparatus according to claim 1, wherein, when a request for additional registration of the messenger application is detected, the controller displays a messenger download page, and when selecting a messenger not installed in the electronic device except for the messenger previously registered in the integrated messenger application, the controller downloads and registers the selected messenger.

5. The apparatus according to claim 1, wherein the controller is configured to:
    display the messenger list;
    simultaneously display the number of unread messages received through the messenger in an area in which the messenger list is displayed; and
    determine a display priority in proportion to the number of the unread messages.

6. The apparatus according to claim 1, wherein the controller is configured to:
    display a plurality of chat windows performed through various messenger applications on one screen in a list form in an execution screen of the integrated messenger application; and
    simultaneously display information on types of the messengers and chat partners in the list.

7. The apparatus according to claim 1, wherein the controller is configured to: display an input window for receiving search target information including at least one of an ID, a name, a phone number, and an e-mail address of a target to be searched in response to a selection of an add friend button; and when receiving an input of information on the search target, search for the target on members registered in at least one or more messengers selected by the user in the messenger list in which at least two or more messengers are registered.

8. The apparatus according to claim 1, wherein the controller is configured to:
    receive the information on the search target for searching for a target previously registered as a friend; and
    when performing the search, display a name of a messenger in which the search target is registered, the search target, and the performed chat list for each type of messenger.

9. The apparatus according to claim 1, wherein, when a message transmission target is determined by information including at least one of a telephone number, an ID, a name, and an e-mail address after creating a new message, the controller controls the integrated messenger application so as to transmit the message to any one of a messenger most recently performing a chat with the transmission target, and a messenger most frequently performing a chat with the transmission target.

10. A method for integrating and executing a plurality of messengers using messenger applications in an electronic device, the method comprising:
   executing an integrated messenger application;
   detecting a user request for adding a messenger in the integrated messenger application;
   displaying a download screen of additionally available messengers;
   when the selected messenger is installed in advance, immediately registering the messenger in the integrated messenger application, and when the selected messenger is not installed, installing the messenger and then registering in the integrated messenger application;
   displaying at least two or more messengers whose registration is completed in a list; and
   selecting one of the at least two or more messengers displayed in the list to perform a function of the messenger,
   wherein user accounts and user authentication information of each registered messenger is stored in a storage unit of, and when lockout of the integrated messenger application is set, and if executing the integrated messenger application, the lockout setting of each messenger is released; and account information of the integrated messenger application and each account information of the registered messengers of the user is displayed on one screen in a list form in response to a menu button selection from the user;
   an add account button is provided for adding the account information to the screen displayed in the list form; when the add account button is selected, a user authentication information inputting environment for inputting user authentication information for each messenger is provided; and
   when inputting the user authentication information, a user authentication is performed based on the input user authentication information to set the integrated messenger application in a state of executing each messenger without an additional authentication process therein.

* * * * *